United States Patent

[11] 3,579,788

[72] Inventor Harold L. Fritzsche
 Fort Wayne, Ind.
[21] Appl. No. 802,861
[22] Filed Feb. 27, 1969
[45] Patented May 25, 1971
[73] Assignee General Electric Company

[54] APPARATUS FOR COMPRESSING LAMINATED CORES
6 Claims, 7 Drawing Figs.

[52] U.S. Cl. ................................................ 29/205,
  29/203, 29/596, 29/609, 310/45
[51] Int. Cl. ................................................ H02k 15/00
[50] Field of Search ........................................ 29/596,
  598, 609, 205, 203; 310/45; 156/222

[56] References Cited
UNITED STATES PATENTS

| | | | |
|---|---|---|---|
| 1,025,318 | 5/1912 | Sharp | 269/8 |
| 1,090,920 | 3/1914 | Knight | 29/205 |
| 2,443,582 | 6/1948 | Lendo et al. | 113/99 |
| 2,477,297 | 7/1949 | Giles et al. | 90/59 |
| 3,122,667 | 2/1964 | Bacin | 310/45 |
| 3,215,966 | 11/1965 | Lord et al. | 29/609(X) |
| 3,513,527 | 5/1970 | Hoy | 29/205 |

Primary Examiner—John F. Campbell
Assistant Examiner—Carl E. Hall
Attorneys—John M. Stoudt, Radford M. Reams, Jon C. Gealow, Frank L. Neuhauser and Oscar B. Waddell ABSTRACT: An assembly for compressing laminated articles, such as stator cores for dynamoelectric machines. There is provided an assembly including a doughnut-shaped electromagnet and a tapered nonmagnetic plug mounted within the electromagnet. A core, previously coated with a material intermixed with magnetic particles, is slipped over the plug and moved by suitable mechanical means toward the center of the electromagnet while the electromagnet is energized. The resultant magnetic field attracts the core to the center of the electromagnet. Also mounted in the assembly are spring-biased clamps which cooperate with adjustable stop members for clamping the core therebetween, thereby mechanically compressing the laminations of the core together. The magnetic field produced by the electromagnet magnetically compresses the laminations and also draws the coating material intermixed with magnetic particles to selected surfaces of the core, thereby forming an increased thickness of material on those surfaces.

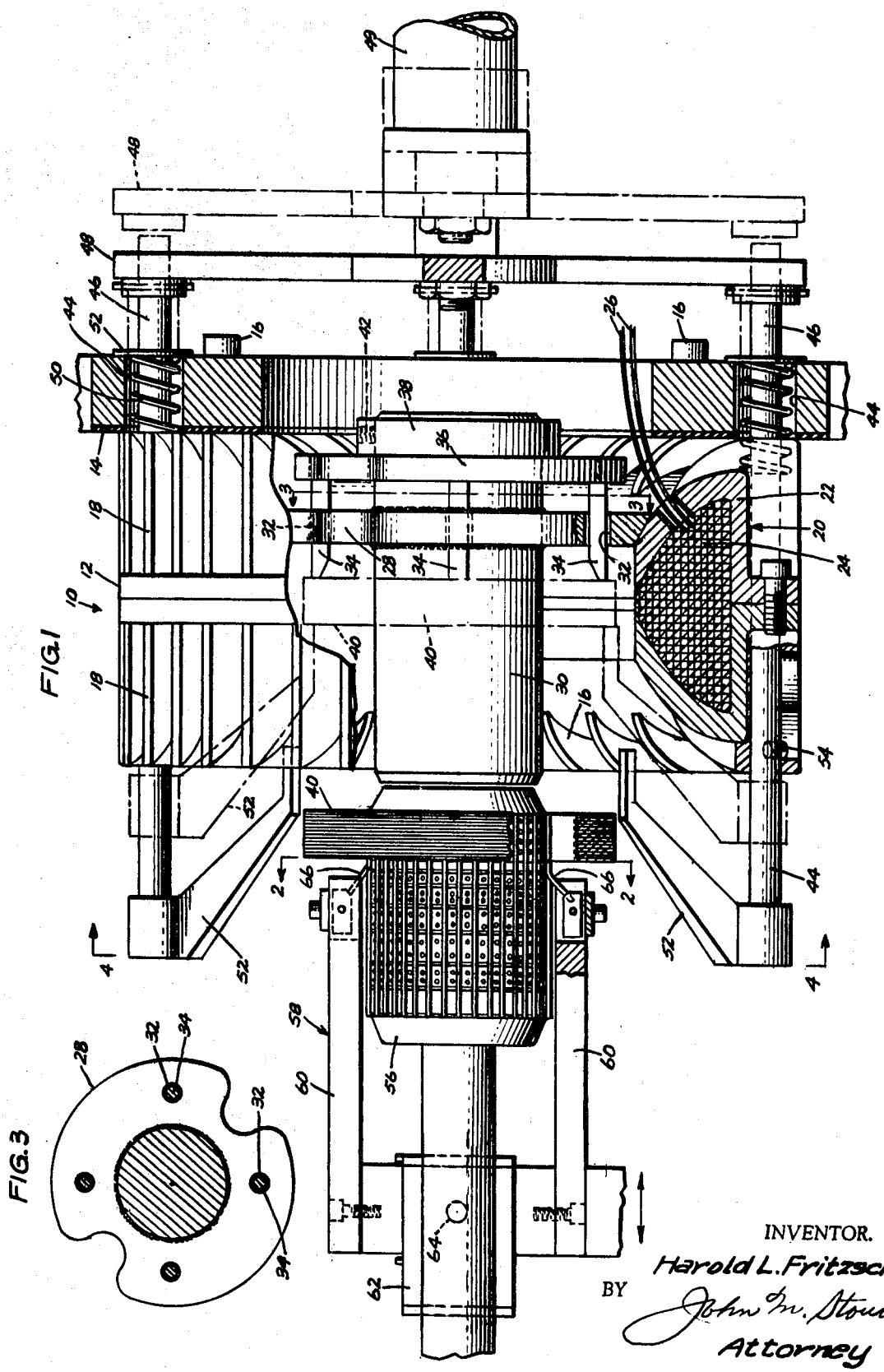

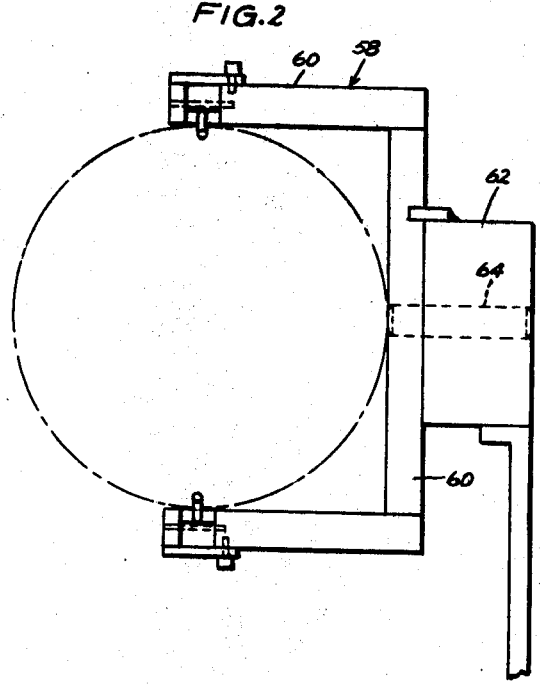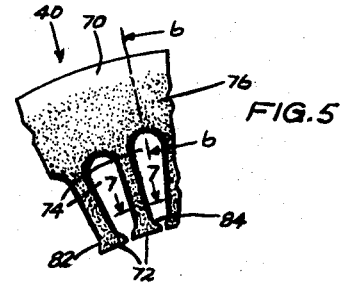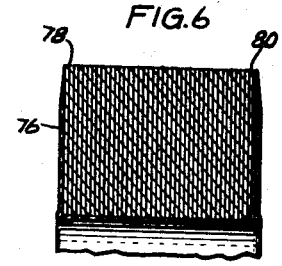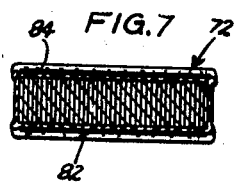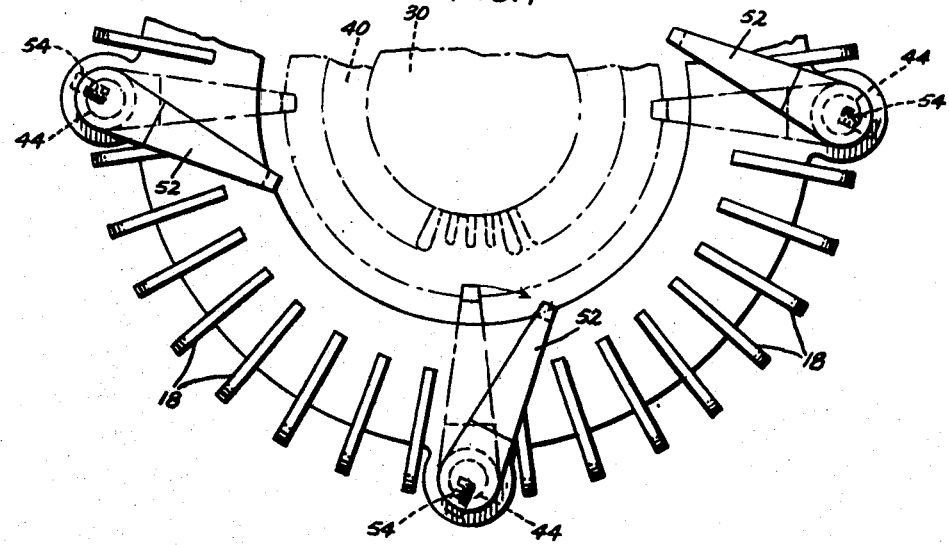

APPARATUS FOR COMPRESSING LAMINATED CORES

CROSS REFERENCE TO RELATED APPLICATIONS

The following copending applications assigned to the same assignee as the present application are expressly incorporated by reference in the present application:

"Method and Apparatus for Compressing Laminated Article While Applying a Protective Coating Thereto," Marion W. Sims, Ser. No. 803,036, filed Feb. 27, 1969

"Method and Apparatus for Producing a Protective Coating on the Surface of a Manufactured Article," Harold L. Fritzsche, Ser. No. 803,036, filed Feb. 27, 1969

BACKGROUND OF THE INVENTION

This invention relates to apparatus for compressing a laminated magnetic article, such as a stator core, which has been coated with a material intermixed with magnetic particles, which material forms an adherent integral protective coating on the article.

In the formation of bondable protective coatings on selected surfaces of a laminated article, for example, formation of an insulating resin layer on slot walls, selected corners, and edges of a magnetic stator core, one of the more attractive approaches, especially from the standpoint of article surface coverage and overall cost, is that disclosed in U.S. Pat. No. 3,136,650, issued to Frank C. Avila on June 9, 1964. In one form of this approach, magnetic particles in a liquid layer of fusible coating material are magnetized to cause the layer to build up or become of increased thickness than would otherwise occur at selected surfaces of the article (e.g., corners and edges).

SUMMARY OF THE INVENTION

An object of the invention is to provide an improved arrangement for compressing a laminated article.

Another object of the invention is to provide such an arrangement in which the laminated article may be rapidly and efficiently transferred to an assembly which automatically mechanically and magnetically compresses the laminated article while a protective coating on selected surfaces of the article is being drawn to selected surfaces of the article to provide an increased thickness of material on those surfaces.

The subject matter of the invention and the above and other objects are particularly pointed out and distinctly claimed in the concluding portion of the specification. The invention itself, however, both as to its organization and method of operation, together with further objects and advantages thereof may best be understood by reference to the following description taken in conjunction with the accompanying drawings.

BRIEF DESCRIPTION OF THE DRAWINGS

FIG. 1 is a side elevational view of one form of the improved apparatus for compressing laminated articles shown in combination with a suitable means for inserting the article into the apparatus;

FIG. 2 is a view along lines 2-2 in the direction of the arrows in FIG. 1;

FIG. 3 is a sectional view taken along line 3-3 in FIG. 1;

FIG. 4 is a sectional view taken along line 4-4 in FIG. 1;

FIG. 5 is an enlarged fragmentary view of a part of the laminated article in the illustrated exemplification after a coating has been formed on selected surfaces thereof;

FIG. 6 is a sectional view taken along line 6-6 in FIG. 5; and

FIG. 7 is a view in section taken along line 7-7 in FIG. 5.

DESCRIPTION OF A PREFERRED EMBODIMENT

FIG. 1 illustrates a preferred embodiment of the invention in the form of an assembly 10 having a housing 12 fixed to a suitable support member 14 which, for example, may be the dialplate or turntable of a rotary indexing assembly portion of a conveyor as illustrated in the aforementioned Fritzsche copending application. The housing 12 may be fixed to member 14 by suitable fastening means, such as bolts 16. Circumferentially spaced about housing 12 are a plurality of cooling fins 18.

Mounted within housing 12 is a doughnut-shaped electromagnet assembly 20 consisting of a hollow annular magnetic pole piece 22 enclosing a substantially toroid-shaped coil 24 having external leads 26 connected to opposite ends of the winding forming the coil. Fixed to the inner periphery of pole piece 22 is a collar 28 having a bore therein for receiving a nonmagnetic slightly tapered plug 30. Plug 30 is fixed to collar 28, for example, by welding. Plug 30 is tapered such that it has a smaller diameter at its left end as viewed in FIG. 1.

Collar 28 contains four equally spaced bores or holes 32 for receiving corresponding stop members 34 which are fixed to a flange 36 on a ring 38. Ring 38 is adjustably mounted on plug 30 in order to accommodate laminated articles, such as a core 40, of different thicknesses. A setscrew 42 permits the axial adjustment of the fingers 34 along the plug 30.

Formed in the support member 14 are four bore holes 44 which receive four corresponding rods 46 which are fixed to a spider assembly 48 which in turn is fixed to a reciprocable drive shaft 49 which, for example, may be connected to the piston of an air cylinder assembly. Mounted in each bore hole 44 is a spring 50 which bears against a flange 52 fixed to each rod 46. These springs function to bias spider assembly 48 to the right as viewed in FIG. 1 and as indicated by the dotted line in position of the assembly. Each rod 46 passes through a bore formed in housing 12 and aligned with the corresponding bore 44 in member 14. Fixed to the opposite end of each rod 46 is a C-shaped clamp member 52. Also fixed to each shaft rod is a pin 54 which rides in a camming slot formed in the housing 12.

In operation, before a core 40 or other laminated article is placed on the tapered element, e.g., plug 30, the spider assembly 48 is moved to the left against the bias of spring 50, thereby moving the C-shaped clamp members 52 to the left as indicated by the full line positions in FIG. 1. The pins 54 on the rods 46 slide in a suitably shaped camming slot to rotate the rods in such a manner that the fingers 52 are also rotated outwardly away from the plug 30 to the full line position shown in FIGS. 1 and 4, thereby permitting a core 40 to be placed on plug 30 without striking the clamps 52.

Prior to loading onto plug 30, the core 40 may be supported on a suitable support and masking assembly 56 as described in the aforementioned Fritzsche application. A suitable transferring assembly 58, as also described in detail in the aforementioned Fritzsche application, may be used to transfer the core from the assembly 56 to the plug 30. At the time the core is being transferred to the plug 30, electromagnet assembly 20 is energized by supplying direct current to the leads 26 to energize the coil 24 and create a magnetic field which assists in the transfer of the core 40 to the plug 30 and more specifically assures that the core 40 is centrally positioned within the electromagnet assembly as shown by the dotted line position of the core in FIG. 1. Since the magnetic field of such a doughnut-shaped electromagnet is strongest at its center, the core will be naturally attracted to the center position.

In order to set up assembly 20 to receive a core of a particular stack length in the proper position within the assembly; setscrew 42, after the core 40 is suitably positioned within the electromagnet assembly 20, is loosened. The ring 38 is then adjusted axially of the plug 30 until the stop members 34 bear against one side of the core 40. Once this has been established for a given size core, it need not be repeated for subsequent cores of that size when using assembly 20 in continuous manufacture of that size core. Then, the force keeping clamps 52 open is removed from rod 49 to permit spider assembly 48 to retract to the right under the force provided by the bias of springs 50. Clamps 52 move into assembly 10 and rotate inwardly to bear against the opposite side of the core 40 as illustrated in FIGS. 1 and 4 by the dotted line positions of the clamps 52. Consequently, the laminations of the core are mechanically compressed together primarily in the yoke section of the core by the cooperation of the clamps 52 and the adjustable stop members 34 while they are also being magnetically compressed by the magnetic field generated by the electromagnet assembly 20 in the manner more fully described in the aforementioned copending Sims application.

After the core has been properly positioned within the electromagnet assembly and compressed as just described, and with the coating being in liquid form of the type discussed in the Avila patent, the magnetic field produced by electromagnet assembly 20 then draws the coating material having magnetic particles therein on the heated core 40 to selected surfaces of the core to form increased thickness of material at those surfaces in the manner described in more detail in the aforementioned Avila patent and copending Sims application.

FIGS. 1 and 2 also illustrate the details of the transferring assembly 58 which is described in the aforementioned Fritzsche copending application. Briefly, a support frame 60 is pivotally mounted to a block 62 by means of a pin 64. A pair of fingers 66 are pivotally mounted on the frame 60 and are adapted to ride upon the surface of the core support and masking assembly 56 and to engage one side of the core 40. This double pivot mounting permits the fingers 56 to apply an even force to the core even if the core surface should be uneven. To transfer the core 40 from assembly 56 to the plug 30, a force is applied to an extension 66 of the frame 60 to force the transferring assembly 58 to the right as viewed in FIG. 1, thereby causing the fingers 66 to engage the side of the core and transfer it to the tapered plug 30.

FIGS. 5, 6 and 7 illustrate various portions of the core 40 after it has been subjected to the magnetic drawing action within the compressing assembly to form an increased thickness of the coating material intermixed with magnetic particles at selected surfaces of the core; e.g., slot corners and edges.

The core 40, as illustrated in this exemplification, has a yoke section 70 and tooth sections 72 defining winding-receiving slots 74. The material 76 covers the entire outer surface of the end laminations 78 and 80 and the slots 74. However, the physical masking action of the air supplied through the core support and masking assembly 56, as defined in more detail in the aforementioned Fritzsche copending application, prevents a coating from being formed on the curved end portions 82 and 84 of each tooth section 72. The support and masking assembly 56 also masks from the coating material the bore of the core as defined by the ends of the tooth section 72. FIGS. 5—7 also illustrates the increased thickness of coating material at the edges and corners of the tooth sections and slots of core 40. This increased thickness is produced by the action of the magnetic field produced by the electromagnet assembly 42 of the compressing assembly 10 illustrated in FIG. 1.

It should be apparent to those skilled in the art that while a preferred embodiment of the invention has been described and illustrated in accordance with the Patent Statutes, changes may be made in disclosed embodiments without actually departing from the true spirit and scope of this invention as defined in the following claims which are intended to cover all such equivalent variations as fall within the invention.

I claim:

1. An apparatus for compressing laminated article comprising:
   a. an electromagnet assembly,
   b. support means fixed to said electromagnet assembly for supporting a laminated article within said assembly,
   c. stop means adjustably mounted on said support means for engaging one side of the article on said support means,
   d. clamping means mounted in said electromagnet assembly for engaging the opposite side of the laminated article and urging the article toward said stop means,
   e. means for electrically energizing said electromagnet assembly for producing a magnetic field, whereby the laminations of said article are mechanically compressed between said stop means and said clamping means and magnetically compressed by the magnetic field.

2. The apparatus defined in claim 1 wherein said electromagnet assembly comprises a substantially toroid-shaped electromagnet having a substantially circular central opening therein, and wherein said support means is disposed in said opening and aligned with the axis of the toroid, and wherein the laminated article is slidable on said support means, whereby the article on said support means is drawn generally to a central position within said electromagnet by the magnetic field produced when said electromagnet assembly is energized.

3. The apparatus defined in claim 2, wherein said clamping means further comprises a plurality of clamps, and means normally biasing said clamps into a position within the opening such that they would engage said opposite side of an article when disposed at said central position within said electromagnet.

4. The apparatus defined in claim 3 wherein said clamping means further comprises a rod fixed to each of said clamps and mounted for rotational and longitudinal movement in said electromagnet assembly, means for applying to each of the rods a force opposite to that of said biasing means to move said clamps longitudinally out of said opening, and means for rotating said rods to move said clamps generally radially out of said opening.

5. The apparatus defined in claim 4 wherein the means for rotating comprises a pin on each rod, said pin riding in a camming slot in said electromagnet assembly, the slot being shaped to rotate said rod when said rod moves longitudinally.

6. The apparatus defined in claim 4 wherein the biasing means comprises a spring associated with each of said rods.